United States Patent
Chen et al.

(10) Patent No.: US 10,178,172 B2
(45) Date of Patent: Jan. 8, 2019

(54) ELECTRONIC APPARATUS AND METHOD FOR EXPANDING STORAGE CAPACITY OF ELECTRONIC APPARATUS

(71) Applicant: QNAP SYSTEMS, INC., New Taipei (TW)

(72) Inventors: Chun-Wei Chen, New Taipei (TW); Yao-Ying Chu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 104 days.

(21) Appl. No.: 15/183,808

(22) Filed: Jun. 16, 2016

(65) Prior Publication Data

US 2017/0257434 A1    Sep. 7, 2017

(30) Foreign Application Priority Data

Mar. 7, 2016 (TW) .............................. 105106949 A

(51) Int. Cl.
*H04L 29/08* (2006.01)
*G06F 17/30* (2006.01)

(52) U.S. Cl.
CPC ........ *H04L 67/1097* (2013.01); *G06F 17/302* (2013.01); *G06F 17/30233* (2013.01); *G06F 17/30864* (2013.01)

(58) Field of Classification Search
CPC ............. G06F 2212/657; G06F 3/0689; G06F 17/30233; G06F 3/061; G06F 3/0685; G06F 3/067; G06F 17/302; G06F 3/0605; G06F 3/0631; G06F 11/1464; G06F 11/3485; G06F 3/0607; G06F 11/1435; G06F 11/1076; G06F 17/30194; G11B 2220/415; H04L 67/1097; H04L 67/06; H04L 12/4641
See application file for complete search history.

(56) References Cited

U.S. PATENT DOCUMENTS

| | | | | |
|---|---|---|---|---|
| 6,260,110 B1 * | 7/2001 | LeCrone | ............... | G06F 3/0607 703/24 |
| 7,617,373 B2 * | 11/2009 | Kalos | .................... | G06F 3/0605 711/112 |
| 7,849,352 B2 * | 12/2010 | Soran | .................... | G06F 3/0608 714/5.11 |

(Continued)

FOREIGN PATENT DOCUMENTS

TW          201433124          8/2014

OTHER PUBLICATIONS

"Office Action of Taiwan Counterpart Application", dated Oct. 14, 2016, p. 1-p. 6.

*Primary Examiner* — Sargon N Nano
(74) *Attorney, Agent, or Firm* — JCIPRNET

(57) ABSTRACT

An electronic apparatus and a method for expanding a storage capacity of the electronic apparatus are provided. In the method, at least one storage equipment on a network is searched and logged in by using a network interface. A virtual disk is established and a volume of at least one disk in each storage equipment is attached to the virtual disk as a physical volume of the electronic apparatus. The physical volume is transformed into a logical volume and a file system of the logical volume is established for providing the electronic device to access the logical volume.

8 Claims, 4 Drawing Sheets

(56) References Cited

U.S. PATENT DOCUMENTS

| | | | | |
|---|---|---|---|---|
| 7,886,111 B2* | 2/2011 | Klemm | G06F 3/0608 | 702/182 |
| 8,301,810 B2* | 10/2012 | Pang | G06F 3/0607 | 710/72 |
| 8,407,448 B1* | 3/2013 | Hayden | G06F 9/45533 | 711/203 |
| 8,554,996 B2* | 10/2013 | Long | G06F 3/0605 | 711/114 |
| 9,372,713 B2* | 6/2016 | Arcese | G06F 9/45558 | |
| 9,489,150 B2* | 11/2016 | Aszmann | G06F 3/0689 | |
| 9,628,350 B2* | 4/2017 | Dippenaar | H04L 41/5051 | |
| 2004/0078465 A1* | 4/2004 | Coates | G06F 3/0613 | 709/226 |
| 2005/0027938 A1* | 2/2005 | Burkey | G06F 3/0605 | 711/114 |
| 2005/0210098 A1* | 9/2005 | Nakamichi | G06F 3/0607 | 709/203 |
| 2006/0013222 A1* | 1/2006 | Rangan | G06F 3/0605 | 370/389 |
| 2006/0020664 A1* | 1/2006 | Umeda | G06F 3/0608 | 709/203 |
| 2008/0052328 A1* | 2/2008 | Widhelm | G06F 17/30233 | |
| 2008/0244577 A1* | 10/2008 | Le | G06F 8/63 | 718/1 |
| 2009/0043878 A1* | 2/2009 | Ni | G06F 3/0613 | 709/223 |
| 2010/0070466 A1* | 3/2010 | Prahlad | G06F 3/0605 | 707/609 |
| 2010/0312962 A1* | 12/2010 | DeKoning | G06F 3/0607 | 711/114 |
| 2012/0290702 A1* | 11/2012 | Vincent | G06F 9/45558 | 709/223 |
| 2013/0246702 A1* | 9/2013 | Shigeta | G06F 12/0223 | 711/112 |
| 2014/0195731 A1* | 7/2014 | Rajasekaran | G06F 3/0617 | 711/112 |

* cited by examiner

ELECTRONIC APPARATUS AND METHOD FOR EXPANDING STORAGE CAPACITY OF ELECTRONIC APPARATUS

CROSS-REFERENCE TO RELATED APPLICATION

This application claims the priority benefit of Taiwan application serial no. 105106949, filed on Mar. 7, 2016. The entirety of the above-mentioned patent application is hereby incorporated by reference herein and made a part of this specification.

BACKGROUND OF THE INVENTION

Field of the Invention

The invention relates to a method and an apparatus for data access, and particularly relates to an electronic apparatus and a method for expanding a storage capacity of the electronic apparatus.

Description of Related Art

Server is an electronic device that integrates software and hardware to provide clients with specific service through a network and has a considerable demand for storage capacity. In addition to the storage capacity provided by internal disks, an ordinary way for expanding the storage capacity is through configuring network-attached storage (NAS) equipment. Through distributing data of the server to the storage equipment on the network and accessing the data via the network, the storage capacity that the server is able to use can be expanded.

However, the NAS equipment provided by different manufacturers may be equipped with different controllers and adopt different management interfaces for data management, such that those NAS equipment cannot directly communicate with each other to integrate their storage capacity. Therefore, when a user intends to expand the storage capacity of the server through connecting plural storage equipment, the user can only perform data access and management on those storage equipment individually, which cannot efficiently integrate those storage equipment to achieve expansion of the storage capacity.

SUMMARY OF THE INVENTION

The application provides an electronic apparatus and a method for expanding a storage capacity of the electronic apparatus, through which different types of storage equipment can be efficiently integrated to expand the storage capacity of the electronic apparatus.

The application provides a method for expanding a storage capacity of an electronic apparatus. In the method, at least one storage equipment on a network is searched and logged in by using a network interface. A virtual disk is established and a volume of at least one disk in each of the searched storage equipment is attached to the virtual disk as a physical volume of the electronic apparatus. The physical volume is transformed into a logical volume and a file system of the logical volume is established for providing the electronic apparatus to access the logical volume.

In an example of the present application, the step of logging in the searched storage equipment by using the network interface comprises obtaining storage information of each of the storage equipment and accordingly sending instructions to the storage equipment to set each of the storage equipment to simulate a target of the network interface, and opening an initiator of the network interface to connect the storage equipment simulating the target of the network interface.

In an example of the present application, after the step of transforming the physical volume into the logical volume and establishing the file system of the logical volume for providing the electronic apparatus to access the logical volume, the method further determines whether the network is disconnected, and logs out the storage equipment simulating the target and detaches the volume of the at least one disk in the storage equipment from the virtual disk if the network is disconnected.

In an example of the present application, after the step of logging out the storage equipment simulating the target and detaching the volume of the at least one disk in the storage equipment from the virtual disk, the method further re-connects the network, and re-opens the initiator of the network interface to search and connect the storage equipment simulating the target of the network interface on the network when the network is re-connected.

In an example of the present application, the step of transforming the physical volume into the logical volume and establishing the file system of the logical volume for providing the electronic apparatus to access the logical volume further comprises establishing a storage pool, combining a volume of at least one disk in the electronic apparatus and the volumes attached to the virtual disk as a physical volume of the storage pool, establishing a logical volume of the storage pool, and establishing a file system of the logical volume for the electronic apparatus to access the logical volume.

The application provides an electronic apparatus which comprises a network connecting device, a storage device and a processor. The network connecting device is configured to connect a network. The storage device is configured to store a plurality of modules. The processor is coupled to the network connecting device and the storage device, and is configured to load and execute the plurality of modules in the storage device. The modules comprise a protocol module, a virtual disk module and a platform module. The protocol module searches at least one storage equipment on the network by using the network connecting device, and logs in the searched storage equipment by using a network interface, wherein each of the storage equipment comprises at least one disk. The virtual disk module establishes a virtual disk and attaches a volume of at least one disk in each of the searched storage equipment to the virtual disk as a physical volume of the electronic apparatus. The platform module transforms the physical volume into a logical volume and establishes a file system of the logical volume for providing the electronic apparatus to access the logical volume.

In an example of the present application, the protocol module comprises obtaining storage information of each of the storage equipment, accordingly sending instructions to the storage equipment to set each of the storage equipment to simulate a target of the network interface, and opening an initiator of the network interface to connect the storage equipment simulating the target of the network interface.

In an example of the present application, the protocol module further determines whether the network is disconnected, and the virtual disk module further logs out the storage equipment simulating the target and detaches the volume of the at least one disk in the storage equipment from the virtual disk if the network is disconnected.

In an example of the present application, the protocol module further re-connects the network, and re-opens the initiator of the network interface to search and connect the storage equipment simulating the target of the network interface on the network when the network is re-connected.

In an example of the present application, the modules further comprise a storage pool module, which establishes a storage pool and combines a volume of at least one disk in the electronic apparatus and the volumes attached to the virtual disk as a physical volume of the storage pool, wherein the platform module further establishes a logical volume of the storage pool and establishes a file system of the logical volume for the electronic apparatus to access the logical volume.

Based on the above, in the electronic apparatus and the method for expanding a storage capacity of the electronic apparatus provided by the present application, a virtual disk is established for attaching volumes of storage equipment on a network. The attached volumes and the volumes of the disks of the electronic apparatus are integrated to establish a file system, through which the electronic apparatus is able to access the disks of the storage equipment and perform data management on the disks of the storage equipment and its own disks, so as to integrate and manage different types of storage equipment to expand the storage capacity.

In order to make the aforementioned and other features and advantages of the invention more comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The invention takes use of internet small computer system interface (iSCSI) to simulate network equipment as a target of iSCSI and implement an initiator of iSCSI on an electronic apparatus such that the electronic apparatus is able to search the network equipment and log in the searched network equipment. The invention further establishes a just a bunch of disks (JBOD) on the electronic apparatus for attaching the volumes of disks in the network equipment. Accordingly, the volumes of network equipment and the volumes of the electronic apparatus itself can be integrated to expand a storage capacity of the electronic apparatus.

Figure 1:
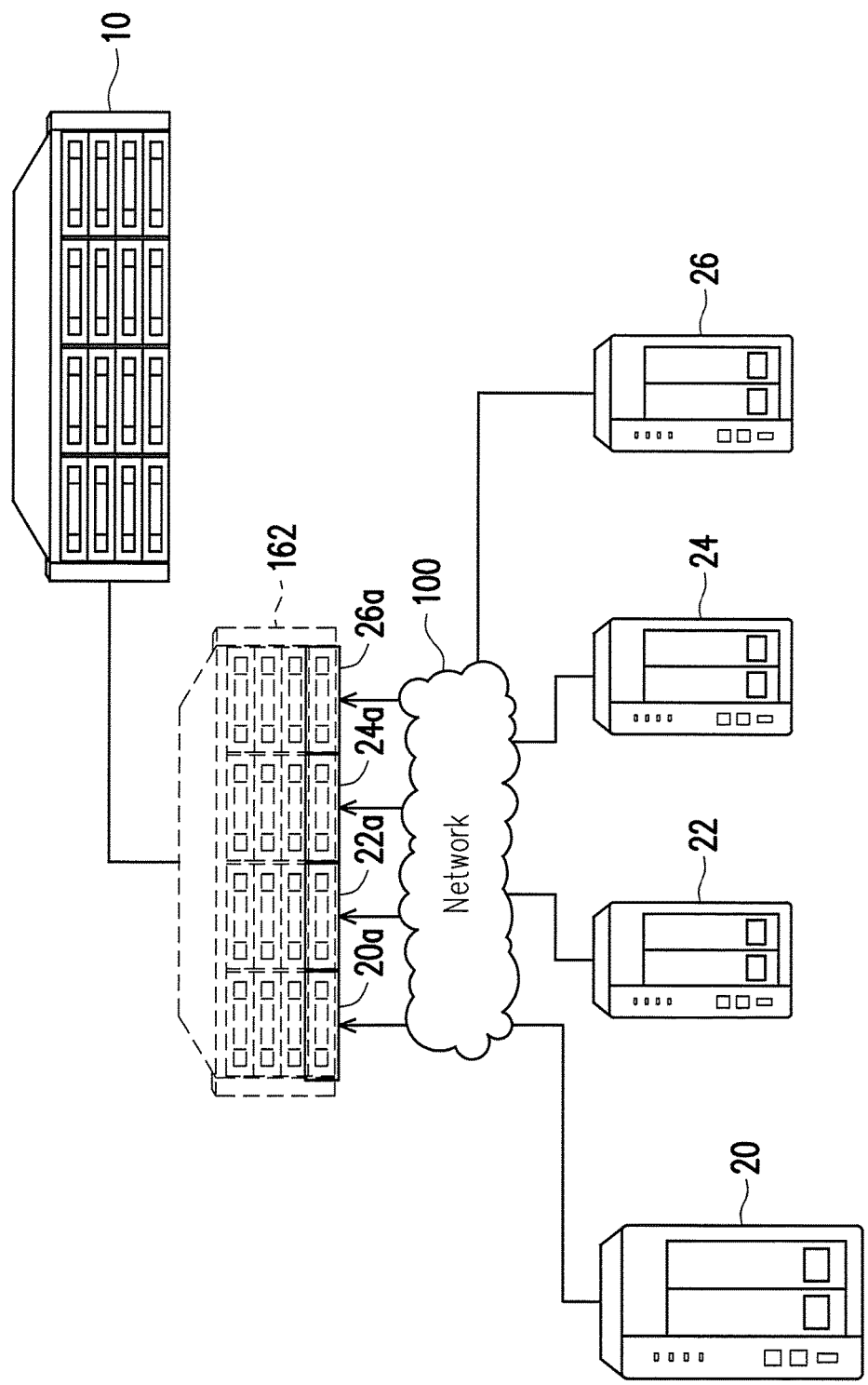
FIG. 1 is a schematic diagram illustrating expansion of a storage capacity of an electronic apparatus according to an embodiment of the invention.

FIG. 1 is a schematic diagram illustrating expansion of a storage capacity of an electronic apparatus according to an embodiment of the invention. Referring to FIG. 1, the electronic apparatus 10 of the present embodiment searches and connects external network equipment 20, 22, 24 and 26 through a network. The electronic apparatus 10 is, for example, a computing device having a computing capability, such as a file server, a database server, an application server, a workstation or a personal computer. The network equipment 20, 22, 24 and 26 is, for example, a network-attached storage (NAS) server or other kinds of network storage equipment, which can provide centralized data accessing service for the electronic apparatuses (including the electronic apparatus 10) on the network 100, and may connect the electronic apparatuses such as computers, TVs, or gaming consoles together for sharing files with each other through the network 100. The network 100 is, for example, Ethernet, Intranet, or Internet, which is not limited herein.

The electronic apparatus 10 establishes a virtual disk 12 (e.g. a JBOD) and attaches the volumes of disks in the network equipment 20, 22, 24 and 26 to the virtual disk 12 as physical volumes 20a, 22a, 24a and 26a of the electronic apparatus 10. The physical volumes 20a, 22a, 24a and 26a are integrated as a single disk by the virtual disk 12 and used as an expanded storage capacity of the electronic apparatus 10.

Figure 2:
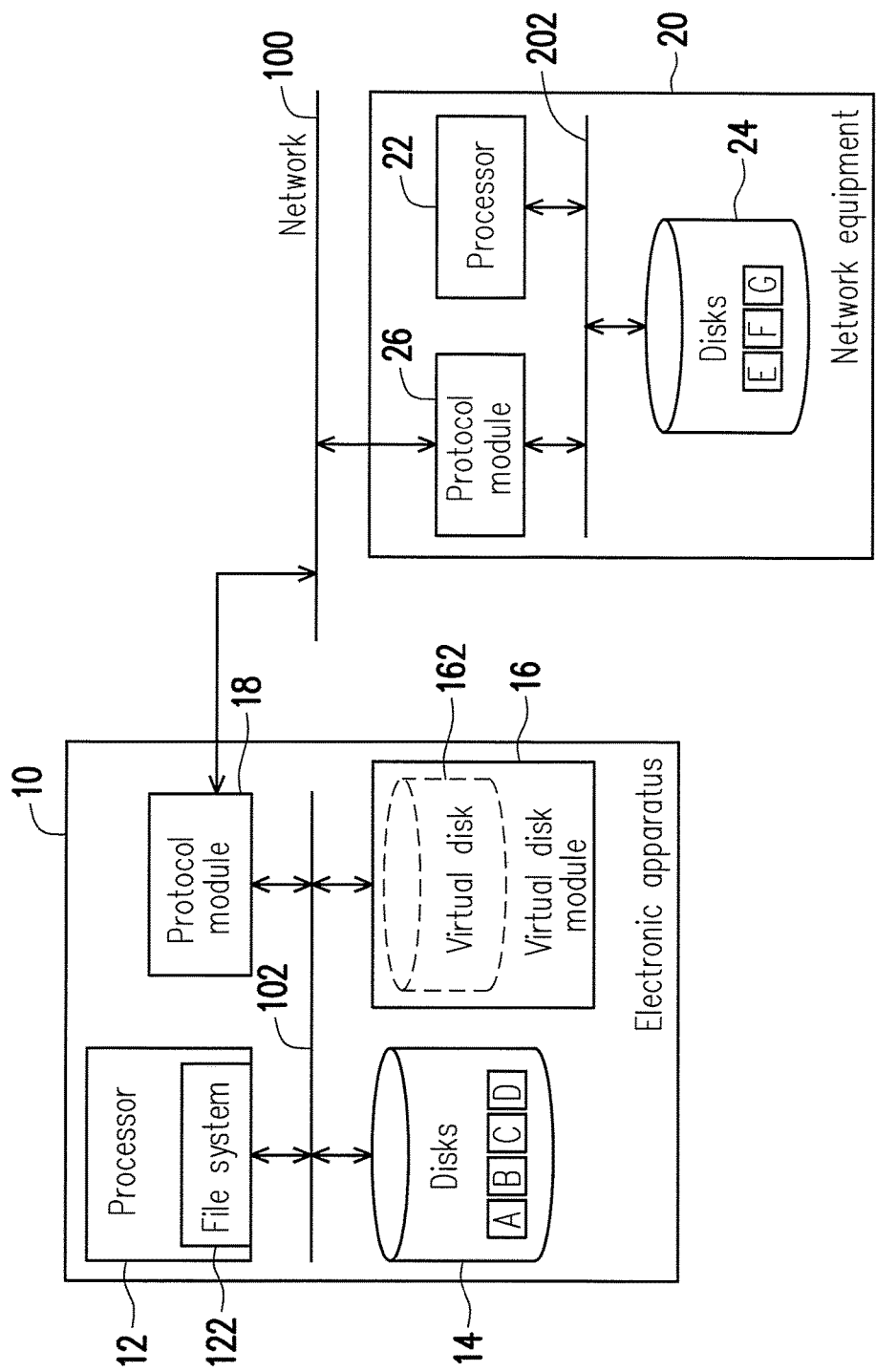
FIG. 2 is a schematic diagram illustrating expansion of a storage capacity of an electronic apparatus according to an embodiment of the invention.

In detail, FIG. 2 is a schematic diagram illustrating expansion of a storage capacity of an electronic apparatus according to an embodiment of the invention. Referring to FIG. 1 and FIG. 2, the present embodiments depicts a system structure of the electronic apparatus 10 and the network equipment 20 in FIG. 1 for illustrating how the electronic apparatus 10 is connected with the network equipment 20 to integrate a disk 24 of the network equipment 20 with a local disk 14 so as to achieve the expansion of the storage capacity of the electronic apparatus 10.

The processor 12, the disks 14 (including disks A, B, C and D), the virtual disk module 16 and the protocol module 18 of the electronic apparatus 10, for example, communicate with each other through a bus 102. The virtual disk module 16 establishes a virtual disk 162 and the protocol module 18 takes use of a network interface such as iSCSI to search the network equipment 20 that supports the network interface on the network 100 and log in the searched network equipment 20 so as to bring the volumes of the disks 24 in the network equipment 20 into the volumes capable of being used by the electronic apparatus 10. The virtual disk module 16, for example, attaches the volumes of the disks 24 (including disks E, F and G) of the network equipment 20 to the virtual disk 162. The volumes of the disks 24 may be, for example, transformed into logical volumes that can be accessed by the electronic apparatus 10 and used to establish a file system 122. Accordingly, the processor 12 of the electronic apparatus 10 may access the disks 24 in the network equipment 20 through the file system 122.

On the other hand, the processor 22, the disks 24 (including disks E, F and G) and the protocol module 26 of the network equipment 20 communicate with each other through a bus 202. The protocol module 26, for example, supports the network interface such as iSCSI so as to simulate the network equipment 20 as a target of the network interface for the protocol module 18 of the electronic apparatus 10 to search and log in and accordingly attach the disks 24 of the network equipment 20 to the virtual disk 162 established by the virtual disk module 16.

Figure 3:
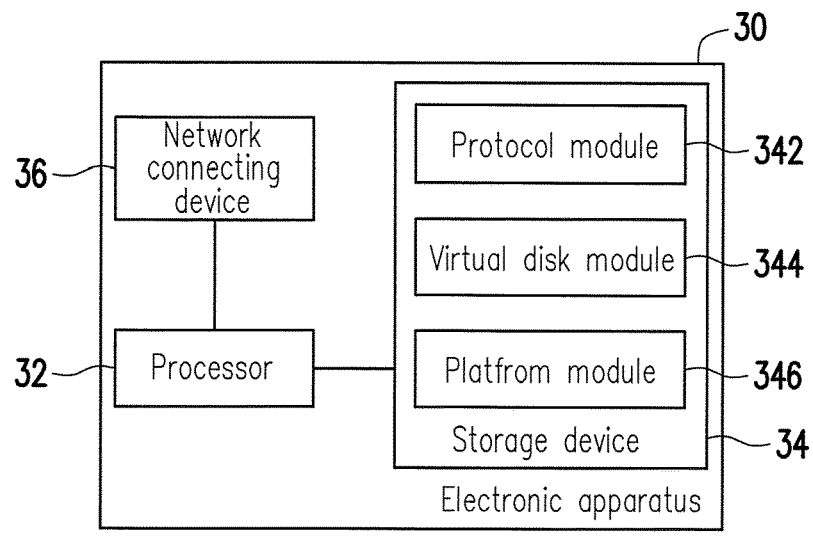
FIG. 3 is a block diagram of an electronic apparatus according to an embodiment of the invention.

FIG. 3 is a block diagram of an electronic apparatus according to an embodiment of the invention. Referring to FIG. 1 and FIG. 2, the electronic apparatus 20 of the present embodiments is, for example, a computing device having a computing capability such as a file server, a database server, an application server, a workstation or a personal computer, and includes a processor 32, a storage device 34 and a network connecting device 26, and functions thereof are respectively described below.

The processor 32 is, for example, a central processing unit (CPU), a programmable general purpose or special purpose microprocessor, a digital signal processor (DSP), a programmable controller, an application specific integrated circuit (ASIC), a programmable logic device (PLD), or any other similar device or a combination thereof.

The storage device 34 is, for example, any type of fixed or movable random access memory (RAM), a read-only memory (ROM), a flash memory or a similar element or a combination of aforesaid elements. In the present embodiment, the storage device 34 is configured to record a protocol module 342, a virtual disk module 344 and a platform module 346. Those modules are, for example, programs stored in the storage device 34 which may be loaded into the processor 32, such that the processor 32 may execute a function of expanding a storage capacity of the electronic apparatus 30 of the present embodiment.

The network connecting device 36 is, for example, a wireless network card in compliance with a wireless communication standard (e.g., institute of electrical and electronics engineers (IEEE) 802.11n/b/g), or a network card in compliance with a wired network connection such as Ethernet. The network card may establish a network connection with other electronic apparatus over a network in a wired or wireless manner.

The processor 32 is coupled to the storage device 34 and the network connecting device 36 and is configured to load the programs of the protocol module 342, the virtual disk module 344 and the platform module 346 from the storage device 34 so as to perform the method for expanding a storage capacity of an electronic apparatus of the application. Examples describing detailed steps of the method will be described below.

Figure 4:
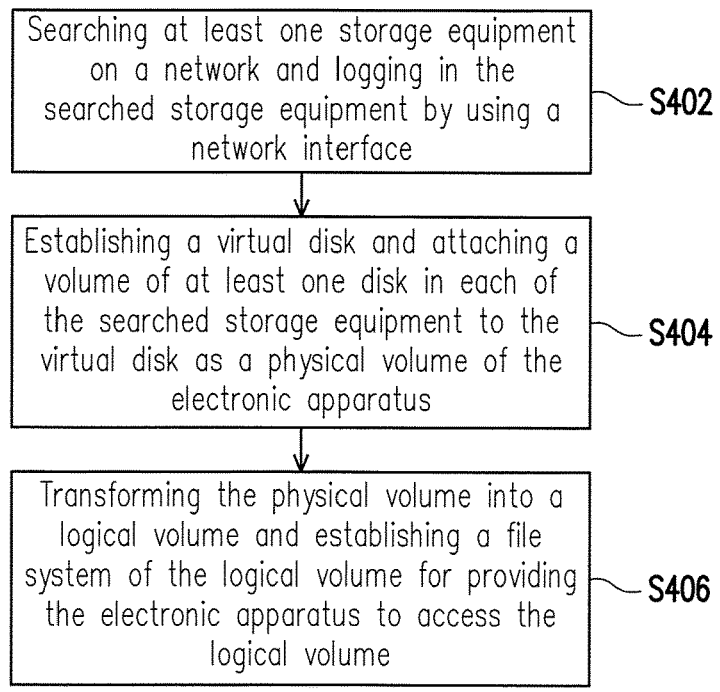
FIG. 4 is a flowchart illustrating a method for expanding a storage capacity of an electronic apparatus according to an embodiment of the invention.

FIG. 4 is a flowchart illustrating a method for expanding a storage capacity of an electronic apparatus according to an embodiment of the invention. Referring to FIG. 3 and FIG. 4 together, the method of the present embodiment is adapted for the electronic apparatus 30 in FIG. 3. Detailed steps in the method of the present embodiment are described below with reference to each component of the electronic apparatus 30 depicted in FIG. 3.

First, the protocol module 342 searches at least one storage equipment on a network by using a network connecting device 36 and logs in the searched storage equipment by using a network interface (step S402). The network interface is, for example, iSCSI based on transmission control protocol/internet protocol (TCP/IP), and the protocol module 342 may search the network equipment supporting iSCSI on the connected network and obtain storage information of each of the searched network equipment through the network. The storage information includes attributes or states of a logical unit number (LUN) such as an equipment name, a disk location, a disk capacity, or supported features. The protocol module 342 may send external instructions to the storage equipment according to the storage information to set each of the storage equipment and simulate the storage equipment as a target of the network interface. Then, the protocol module 342 may open an initiator of the network interface to connect the storage equipment simulating the target of the network interface.

Afterwards, the virtual disk module 344 establishes a virtual disk and accordingly attaches volumes of disks in each of the storage equipment logged-in by the protocol module 342 to the virtual disk as physical volumes of the electronic apparatus 30 (step S404). The virtual disk integrates all the attached disks into a single disk having a storage capacity equal to a sum of the storage capacity of all the attached disks where the volume of each disk is an independent physical volume.

Finally, the platform module 346 transforms the physical volume of each of the storage equipment into a logical volume and establishes a file system of the transformed logical volumes for the electronica apparatus 30 to access the logical volumes (step S406). The platform module 346 is, for example, implemented as a hardware abstraction layer (HAL) which can present different portions of the system as abstract hardware equipment. Since the physical volumes of all the storage equipment are directly transformed into logical volumes capable of being used by the electronic apparatus 30, the processor 32 of the electronic apparatus 30 can directly access the disks provided by the storage equipment on the network through aforesaid file system, thus achieving better access efficiency.

It is noted that in the meantime that the electronic apparatus 30 connects the network equipment and accesses the disks of the network equipment, the protocol module 342 may keep monitoring whether the network connection thereof (or the network connection to each of the network equipment) is disconnected. Once the network connection is determined to be disconnected, the protocol module 342 may attempt to re-connect the network first. For example, the protocol module 342 may attempt to re-connect the network at a predetermined interval (e.g. 5 seconds), and may confirm the network connection is disconnected after attempting by a predetermined times (e.g. 6 times).

When the protocol module 342 confirms the network connection is disconnected, the virtual disk module 344 may instantly log out the storage equipment (e.g. all the storage equipment or the storage equipment having the network connection disconnected) that has already simulated as the target and detach the volumes of the disks of the storage equipment in the virtual disk, so as to prevent the electronic apparatus 30 from data loss due to accessing wrong data or storing data in wrong volume. Besides, the protocol module 342 may keep trying to re-connect the network, re-open the initiator of the network interface when the network is re-connected so as to search and connect the storage equipment simulating the target of the network interface on the network.

Through aforesaid recovery mechanism, even though the network connection of the electronic apparatus 30 is disconnected due to any reason, the correctness and security of data of the electronic apparatus 30 can be ensured.

In addition to aforesaid embodiment of expanding the storage capacity by using the virtual disk, in another embodiment, the electronic apparatus may further integrate the volumes of disks of the storage equipment with the volumes thereof so as to additionally support advanced functions such as disk snapshot or disk backup.

Figure 5:
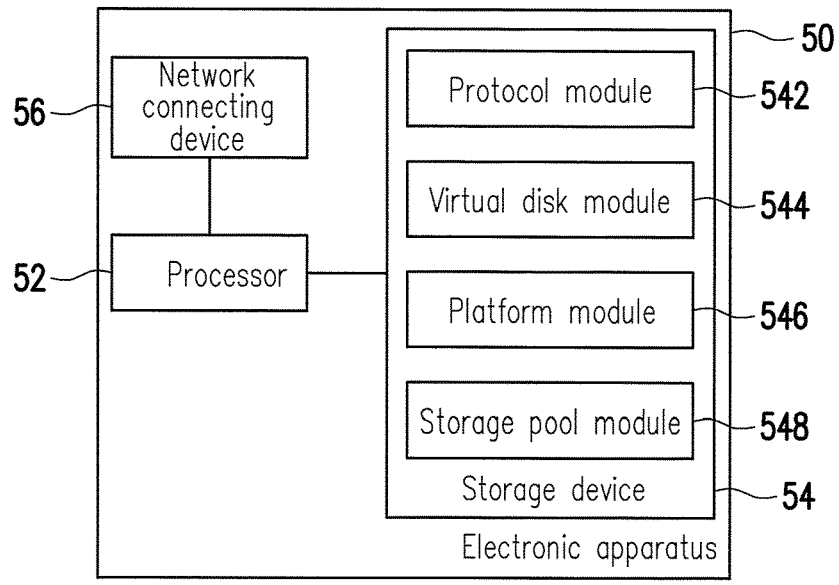
FIG. 5 is a block diagram of an electronic apparatus according to an embodiment of the invention.

In detail, FIG. 5 is a block diagram of an electronic apparatus according to an embodiment of the invention. Referring to FIG. 5, the electronic apparatus 50 of the present embodiments is, for example, a computing device having a computing capability such as a file server, a database server, an application server, a workstation or a personal computer, and includes a processor 52, a storage device 54 and a network connecting device 56. The types and functions of the processor 52, a storage device 54 and a network connecting device 56 are the same as or similar to those of the processor 32, the storage device 34 and the network connecting device 36 in aforesaid embodiment and therefore the details are not repeated herein.

Different from aforesaid embodiment, in the present embodiment, besides the protocol module 542, the virtual disk module 544 and the platform module 546 (respectively corresponding to the protocol module 342, the virtual disk module 344 and the platform module 346 in aforesaid embodiment), the storage device 54 further comprises a storage pool module 548.

Figure 6:
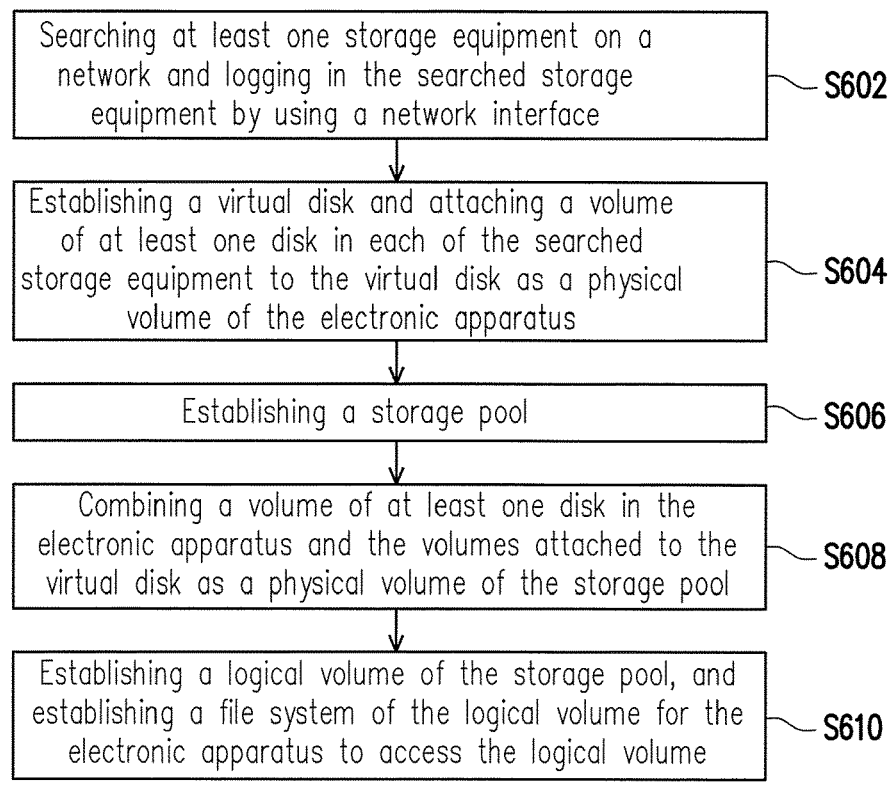
FIG. 6 is a flowchart illustrating a method for expanding a storage capacity of an electronic apparatus according to an embodiment of the invention.

FIG. 6 is a flowchart illustrating a method for expanding a storage capacity of an electronic apparatus according to an embodiment of the invention. Referring to FIG. 5 and FIG. 6 together, the method of the present embodiment is adapted for the electronic apparatus 50 in FIG. 5. Detailed steps in the method for expanding a storage capacity of an electronic apparatus of the present embodiment are described below with reference to each component of the electronic apparatus 50 depicted in FIG. 5.

First, the protocol module 542 searches at least one storage equipment on a network by using a network connecting device 56 and logs in the searched storage equipment by using a network interface (step S602). Then, the virtual disk module 544 establishes a virtual disk and accordingly attaches volumes of disks in each of the storage equipment logged-in by the protocol module 542 to the virtual disk as physical volumes of the electronic apparatus 50 (step S604). Aforesaid steps S602~S604 are the same as or similar to the steps S402~S404 in aforesaid embodiment, and therefore the details are not repeated herein.

Different from aforesaid embodiment, in the present embodiment, a storage pool module 548 of the electronic apparatus 50 may further establish a storage pool (step S606), and combine the volume of at least one disk (e.g. the storage device 54) with the volumes attached to the virtual disk as the physical volume of the storage pool (step S608). The storage module 548 may, for example, establish a pool management layer of the storage pool on the physical volume of the storage pool, so as to provide advanced management functions such as disk snapshot or disk backup.

Finally, the platform module 546 transforms aforesaid physical volume of the storage pool into a logical volume, and establishes a file system of the logical volume so as to provide the electronic apparatus 50 to access the logical volume (step S610). Through establishing a storage pool management layer on the physical volume of the storage pool, in addition to accessing the disks of the storage equipment on the network through the file system, the electronic apparatus 50 may further take use of the disks of these storage equipment to execute functions on its own disks such as disk snapshot or disk backup.

To sum up, in the electronic apparatus and a method for expanding a storage capacity of the electronic apparatus of the invention, the network equipment is simulated as a target of a network interface and an initiator of the network interface is implemented on the electronic apparatus such that the electronic apparatus is able to search and log in the network equipment on the network. The invention further establishes a virtual disk on the electronic apparatus for attaching volumes of disks of the network equipment and integrates the attached volumes with the volumes of disks of the electronic apparatus itself, such that the electronic apparatus may further support management of storage devices while expanding the storage capacity.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for expanding a storage capacity of an electronic apparatus, comprising:
    searching, by a processor, at least one storage equipment on a network by using a network card and logging in the searched storage equipment by using an iSCSI, wherein the iSCSI conforms transmission control protocol/internet protocol;
    establishing, by the processor, a virtual disk and attaching a volume of at least one disk in each of the searched storage equipment to the virtual disk as a physical volume of the electronic apparatus;
    transforming, by the processor, the physical volume into a logical volume and establishing, by the processor, a file system of the logical volume for providing the electronic apparatus to access the logical volume,
    wherein the step of logging in the searched storage equipment by using the iSCSI comprises:
    obtaining, by the processor, a storage information of each of the storage equipment and accordingly sending, by the processor, instructions to the storage equipment to set each of the storage equipment to simulate a target of the iSCSI; and
    opening, by the processor, an initiator of the iSCSI to connect the storage equipment simulating the target of the iSCSI.

2. The method according to claim 1, wherein after the step of transforming the physical volume into the logical volume and establishing the file system of the logical volume for providing the electronic apparatus to access the logical volume, the method further comprises:
    determining, by the processor, whether the network is disconnected; and
    logging out, by the processor, the storage equipment simulating the target and detaching, by the processor, the volume of the at least one disk in the storage equipment from the virtual disk if the network is disconnected.

3. The method according to claim 2, wherein after the step of logging out the storage equipment simulating the target and detaching the volume of the at least one disk in the storage equipment from the virtual disk, the method further comprises:
    re-connecting, by the processor, the network; and
    re-opening, by the processor, the initiator of the iSCSI to search and connect the storage equipment simulating the target of the iSCSI on the network when the network is re-connected.

4. The method according to claim 1, wherein the step of transforming the physical volume into the logical volume and establishing the file system of the logical volume for providing the electronic apparatus to access the logical volume further comprising:
    establishing, by the processor, a storage pool;
    combining, by the processor, a volume of at least one disk in the electronic apparatus and the volumes attached to the virtual disk as the physical volume of the storage pool; and
    establishing, by the processor, the logical volume of the storage pool, and establishing, by the processor, the file system of the logical volume for the electronic apparatus to access the logical volume.

5. The electronic apparatus according to claim 1, wherein the processor further determines whether the network is disconnected, and the virtual disk module further logs out the storage equipment simulating the target and detaches the volume of the at least one disk in the storage equipment from the virtual disk if the network is disconnected.

6. The electronic apparatus according to claim 5, wherein the processor further re-connects the network, and re-opens the initiator of the iSCSI to search and connect the storage equipment simulating the target of the iSCSI on the network when the network is re-connected.

7. An electronic apparatus, comprising:
   a network card, connecting a network;
   a storage device, storing a plurality of modules; and
   a processor, coupled to the network connecting device and the storage device, loading and executing the plurality of modules in the storage device to perform steps of:
      searching at least one storage equipment on the network by using the network card, and logging in the searched storage equipment by using an iSCSI, wherein the iSCSI conforms transmission control protocol/internet protocol, and each of the storage equipment comprises at least one disk;
      establishing a virtual disk and attaching a volume of the at least one disk in each of the searched storage equipment to the virtual disk as a physical volume of the electronic apparatus; and
      transforming the physical volume into a logical volume and establishing a file system of the logical volume for providing the electronic apparatus to access the logical volume,
   wherein the processor comprises obtaining a storage information of each of the storage equipment, accordingly sending instructions to the storage equipment to set each of the storage equipment to simulate a target of the iSCSI, and opening an initiator of the iSCSI to connect the storage equipment simulating the target of the iSCSI.

8. The electronic apparatus according to claim 7, wherein the processor further comprise:
   establishing a storage pool, and combining a volume of at least one disk in the electronic apparatus and the volumes attached to the virtual disk as the physical volume of the storage pool, wherein the platform module further establishes the logical volume of the storage pool, and establishes the file system of the logical volume for the electronic apparatus to access the logical volume.

* * * * *